United States Patent
Miyazaki et al.

(10) Patent No.: US 9,630,438 B1
(45) Date of Patent: Apr. 25, 2017

(54) MARKING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Yasunari Miyazaki, Sunto Shizuoka (JP); Masato Ogasawara, Tokyo (JP); Daisuke Yamashita, Zunokuni Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/005,414

(22) Filed: Jan. 25, 2016

(51) Int. Cl.
  *B41M 7/00* (2006.01)
  *H04N 1/21* (2006.01)
  *H04N 1/00* (2006.01)

(52) U.S. Cl.
  CPC ...... *B41M 7/0009* (2013.01); *H04N 1/00803* (2013.01); *H04N 1/2162* (2013.01); *H04N 2201/0094* (2013.01)

(58) Field of Classification Search
  CPC ...... B41M 7/00; B41M 7/0009; B41M 7/009; B41J 2/32; B41J 29/26; B41J 2202/37; G03G 15/5062; G03G 21/00; H04N 1/00803; H04N 1/2162; H04N 2201/0094
  See application file for complete search history.

(56) References Cited

U.S. PATENT DOCUMENTS

| | | | | |
|---|---|---|---|---|
| 6,071,352 A | * | 6/2000 | Sugie | B41M 7/0009 134/1 |
| 6,236,831 B1 | * | 5/2001 | Mei | B41J 29/36 15/102 |
| 2004/0080787 A1 | * | 4/2004 | Kakikawa | B41M 7/0009 358/1.18 |
| 2013/0258026 A1 | * | 10/2013 | Iguchi | B41M 7/0009 347/179 |
| 2015/0116439 A1 | | 4/2015 | Kamimura | |

* cited by examiner

*Primary Examiner* — Kristal Feggins
(74) *Attorney, Agent, or Firm* — Amin, Turocy & Watson LLP

(57) ABSTRACT

Certain embodiments provide a marking apparatus that including a determination section configured to determine the type of a medium on which an image is formed with decolorable image forming material, a recording section configured to record a mark indicating the decolored times of the image on the medium on which the image is formed with the decolorable image forming material, and a change section configured to change a recording method of the mark recorded by the recording section according to the determination result of the medium determined by the determination section.

10 Claims, 5 Drawing Sheets

FIG.3

| TYPE OF MEDIUM | DECOLORABLE TIMES | MARKING AREA |
|---|---|---|
| NORMAL SHEET | 5 | DEFAULT VALUE (A0) |
| RECYCLED SHEET, SPECIAL SHEET | 3 | GREATER THAN A0 |
| GRAMMAGE $<$ 64 G/M$^2$ | 3 | GREATER THAN A0 |
| 64 G/M$^2$ $<$ GRAMMAGE $<$ 163 G/M$^2$ | 5 | DEFAULT VALUE (A0) |
| GRAMMAGE $>$ 163 G/M$^2$ | 7 | SMALLER THAN A0 |

MARKING APPARATUS

FIELD

Embodiments described herein relate generally to a marking apparatus.

BACKGROUND

Conventionally, a printing apparatus is known for forming an image with a decolorable image forming material, for example, toner.

A decoloring apparatus is used to decolor an image. The decoloring apparatus prints a mark indicating the decolored times on a medium.

The decoloring apparatus determines that a sheet reused for the certain times, for example, five times, is non-reusable later according to the mark. However, actually, the reusable times differs in different media. A thick sheet can be reused more than five times.

However, the decoloring apparatus records the same marks on the media regardless of the type of the media, and discharges a paper determined to be non-reusable as the paper has been used more than the uniform reuse times to a reject tray that accumulates the non-reusable paper.

DESCRIPTION OF THE DRAWINGS

FIG. 3 is a table view illustrating a recording method corresponding to the type of a medium through a change section of the marking apparatus according to the embodiment;

DETAILED DESCRIPTION

Figure 1:
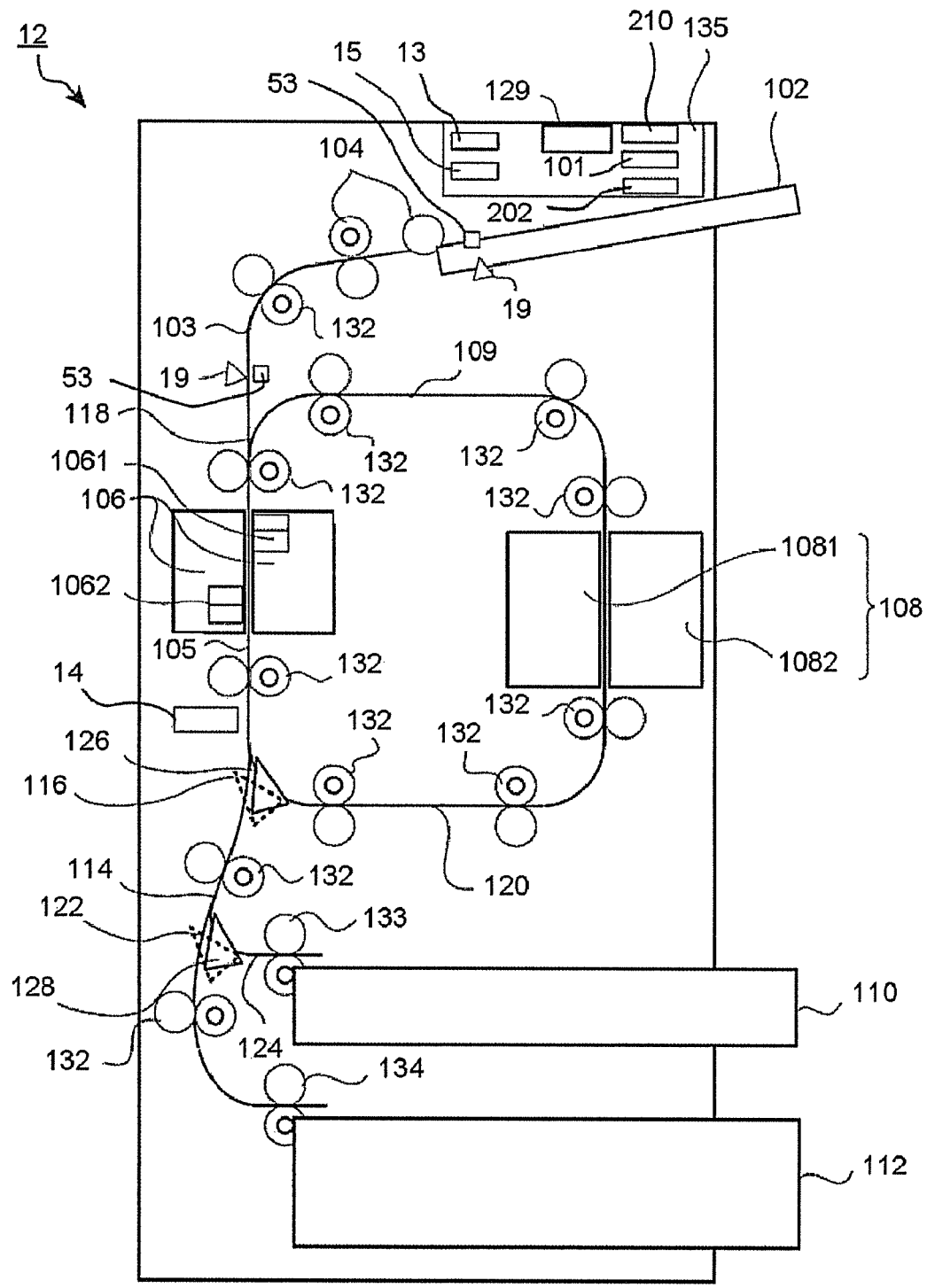
FIG. 1 is a diagram illustrating the structure of a decoloring apparatus for decoloring an image on a medium from a marking apparatus according to an embodiment.

Certain embodiments provide a marking apparatus that including a determination section configured to determine the type of a medium on which an image is formed with decolorable image forming material; a recording section configured to record a mark indicating the decolored times of the image on the medium on which the image is formed with the decolorable image forming material; and a change section configured to change a recording method of the mark recorded by the recording section according to the determination result of the medium determined by the determination section.

The marking apparatus is described in detail with reference to the accompanying drawings hereinafter. Further, the same components in each figure are applied with the same reference numerals, and the repeated description is omitted.

First Embodiment

FIG. 1 is a diagram illustrating the structure of a marking apparatus according to the first embodiment.

The marking apparatus according to the present embodiment is a decoloring apparatus 12.

The "decoloring" refers to erasing the color of an image with a decolorization color material contained in image forming material.

The image is formed with decolorable image forming material. In this embodiment, a toner is used as the image forming material. An MFP (multi-functional peripheral) forms the image with the toner.

A printing mark is printed with non-decolorable ink. A recording section 14 of the decoloring apparatus 12 prints the printing mark on a medium. The printing mark may be formed with decolorable ink.

The decoloring apparatus 12 decolors the image by heating the toner on the medium.

The decoloring apparatus 12 comprises a determination section 13, a change section 15 and the recording section 14.

The determination section 13 determines the type of a medium on which an image is formed with the decolorable toner.

The change section 15 changes a recording method of a mark indicating the times recorded by the recording section 14 according to the determination result of the medium determined by the determination section 13.

The times refers to a printing mark indicating the reuse times. The "recording method of the mark" refers to a method of adding the printing mark to a sheet.

Specifically, the change of the recording method of the mark makes a marking area (marking size) of a printing mark indicating the times of life of reuse of a medium changed.

The recording section 14 is an inkjet head printer.

In FIG. 1, the decoloring apparatus 12 feeds a medium from a sheet feed tray 102.

The decoloring apparatus 12 provides a media sensor 113 in the sheet feed tray 102. The decoloring apparatus 12 further provides a media sensor 19 in a sheet feed section 104.

The media sensor 113 includes a light source 53 that emits light to the medium. The media sensor 113 detects light intensity according to the reflected light from the medium. The media sensor 19 is the same as the media sensor 113.

The decoloring apparatus 12 includes the sheet feed section 104, a plurality of pairs of rollers 132 and a guide 103 at the downstream side (downstream side of the medium conveyance direction) of the sheet feed tray 102.

The sheet feed section 104 feeds media one by one from the sheet feed tray 102 to the guide 103.

A plurality pairs of rollers 132 sends the medium. The guide 103 is defined as a conveyance path.

The decoloring apparatus 12 includes a merging point 118 at the lower part of the guide 103.

The decoloring apparatus 12 includes a scanner 106 at the lower part of the merging point 118.

The scanner 106 reads printing marks with marking areas that differ according to the decolored times. The recording section 14 prints the printing marks with the marking areas corresponding to the total times.

The scanner 106 may be equipped with scanner units 1601 and 1602 respectively arranged at a first surface side and a second surface side of the medium.

The scanner unit 1601 is a CCD (Charge Coupled Device) scanner or a CMOS (Complementary Metal Oxide Semiconductor) sensor. The scanner unit 1602 is the same as the scanner unit 1601.

Furthermore, the decoloring apparatus 12 is provided with an operation panel 135, a controller 129 and a page memory 202.

The operation panel 135 is a user interface to the decoloring apparatus 12. The operation panel 135 includes a numerical keypad, a stop key, a start key and a window.

The controller 129 controls the conveyance of the medium of the decoloring apparatus 12.

The controller 129 switches the rotational position state of each of gates 126 and 128. The gates 126 and 128 are supported rotatably in the decoloring apparatus 12.

The page memory 202 stores a scan image from the scanner 106. The scan image is bitmap image data.

The decoloring apparatus 12 includes a guide 105 and a first branch point 116 at the lower part of the scanner 106.

The gate 126 is located at the first branch point 116. The gate 126 sends the medium from the guide 105 to either of a guide 114 and a guide 120.

The decoloring apparatus 12 includes an eraser 108 at the downstream side in a conveyance direction from the first branch point 116 to the guide 120. The scanner 106, the eraser 108 and the scanner 106 together constitute a conveyance path of a closed loop.

The controller 129 switches the gate 126 to a first rotational position. Through the switching operation, the decoloring apparatus 12 enables medium from the sheet feed tray 102 to circle the closed loop in the sequence of the scanner 106, the eraser 108 and the scanner 106.

The eraser 108 is equipped with decoloring units 1081 and 1082 respectively arranged at the first surface side and the second surface side of the medium.

The eraser 108 erases the color of the image on the image region of the medium.

The "decolorization color material" refers to decolorable color material, for example, decolorable toner.

Specifically, the decolorization color material contains color generation compound, color developing agent and discoloring agent. The color generation compound is leuco dye. The color developing agent is phenols.

The discoloring agent is a substance that melts together with the color generation compound by being heated. The color developing agent and a substance with no affinity are used in the discoloring agent.

The decolorization color material develops color through interaction of the color generation compound and the color developing agent.

The interaction of the color generation compound and the color developing agent is cut off as the decolorization color material is heat to a decoloring temperature or a temperature higher than the decoloring temperature. Through the cut-off process, the decolorization color material becomes achromatic.

The decoloring temperature is higher than the fixing temperature.

The decoloring apparatus 12 includes a guide 109 at the upper part of the eraser 108. The merging point 118 is located at the downstream side of the guide 109 in the medium conveyance direction.

The decoloring apparatus 12 includes the recording section 14 between a second branch point 122 and the scanner 106. The recording section 14 is located at the downstream side of the scanner 106.

The recording section 14 comprises a tank, non-decolorable ink in the tank and an inkjet head (none is shown).

The recording section 14 ejects ink from the inkjet head to the medium. The ink is erasable decolorization color material.

The recording section 14 records the printing mark on the medium with the ink.

Further, the decoloring apparatus 12 includes a guide 114 at the lower part of the recording section 14. The decoloring apparatus 12 includes the second branch point 122 at the lower part of the guide 114.

The decoloring apparatus 12 includes a gate 128 at the second branch point 122. The gate 128 sends the medium from the guide 114 to either of a reuse tray 110 and a reject tray 112.

The reuse tray 110 is a tray to which a medium for reuse is discharged through a discharge roller 133.

The reject tray 112 is a tray to which a rejected medium is discharged through a discharge roller 134.

Figure 2:
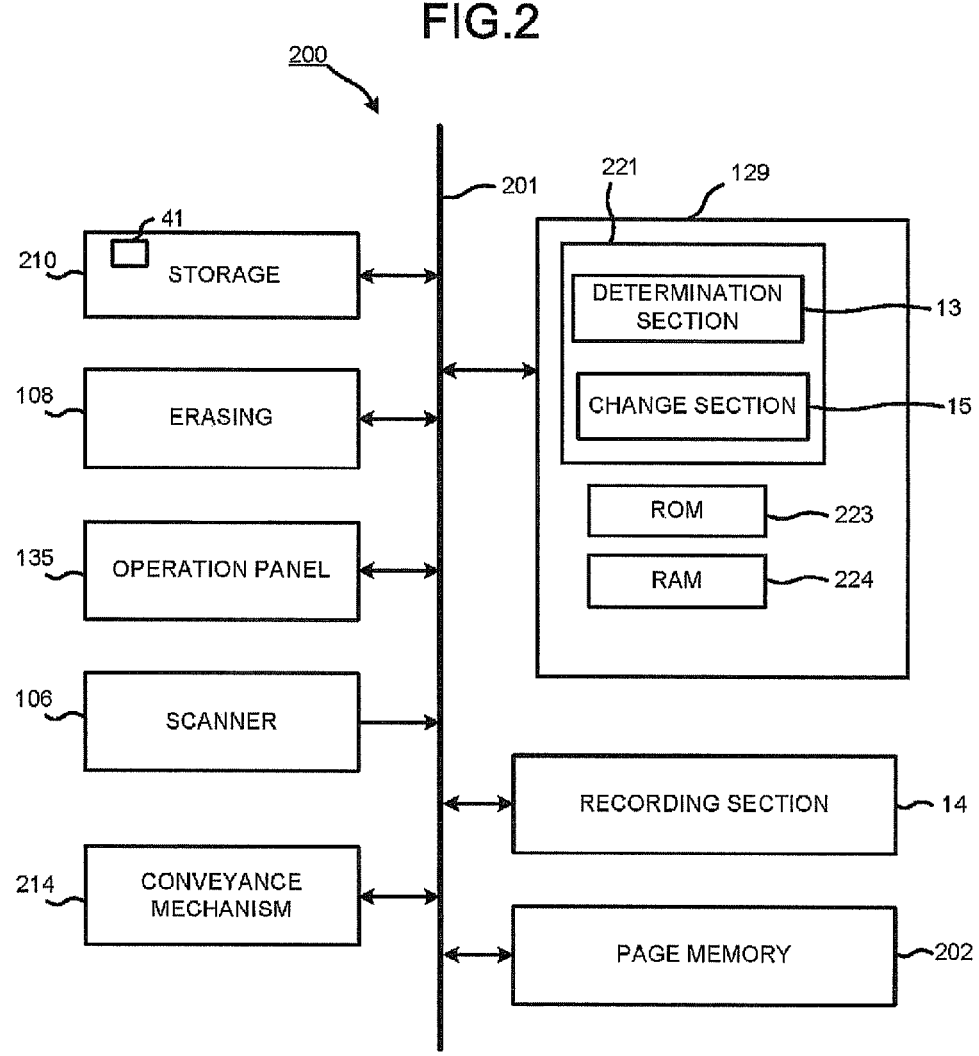
FIG. 2 is a block diagram illustrating a control system of the decoloring apparatus for decoloring the image on the medium from the marking apparatus according to the embodiment.

FIG. 2 is a block diagram of a control system of the decoloring apparatus 12. The described reference numerals indicate the same elements.

A control system 200 includes the determination section 13, the change section 15 and the recording section 14.

The determination of the type of a medium by the determination section 13 is carried out with the use of any one of the following (a) through (c): (a) the media sensor 19; (b) cassette information of the sheet feed tray 102 and (c) selection input of a user on the operation panel 135.

The determination section 13 reads a marking region for marking assigned in a margin region from the scan image. The determination section 13 calculates a ratio of the area of the printing mark to the area of the marking region.

The change section 15 changes the marking area of the printing mark according to the type of the medium.

The marking area refers to a total area of the printing mark.

FIGS. 5A through 5I are diagrams respectively illustrating a plurality of printing marks. The same reference numerals manually indicate the same elements.

Figure 5A:
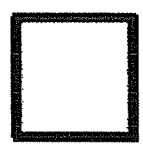
FIGS. 5A through 5I are diagrams respectively illustrating a plurality of marks through the marking apparatus according to the embodiment.

For example, the marking area of a rectangular printing mark like FIG. 5A is assumed as a reference area. The change section 15 changes the reference marking area of FIG. 5A to a marking area larger than that of FIG. 5C for a thin medium.

Figure 5B:
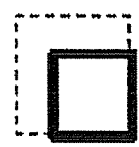

The change section 15 changes the reference marking area of FIG. 5A to a marking area smaller than that of FIG. 5B for a thick medium. The region to be marked is predetermined, and the determination section 13 determines whether or not the medium can further be reused by calculating a ratio of the total of areas of the markings to the marking area.

The change section 15 includes a memory table 41 in which the type of a medium and the maximum times the medium can be decolored are associated with each other.

FIG. 3 is a table illustrating a recording method according to the type of a medium, and the memory table 41 is exemplified.

The decolorable times of a normal sheet (grammage 64~80 g/m$^2$) is, for example, 5 times.

A marking area of the normal sheet is applied with a default value A0 in advance. The default value A0 of the marking area is pre-stored by the controller 129 (FIG. 2).

The grammage refers to the weight of a medium defined by ISO (International Organization for Standardization) 536:1995 or JIS (Japanese Industrial Standards) P 8124: 2011.

The following objects are exemplified as the media to be used.

(in FIG. 3,
(1) normal sheet
(2) recycled sheet or special sheet (3) a sheet of which grammage is smaller than 64 g/m$^2$ (4) a sheet of which grammage is greater than 64 g/m$^2$ and smaller than 163 g/m$^2$ (5) a sheet of which grammage is greater than 163 g/m$^2$.

The recycled sheet refers to a medium containing recycled fiber that accounts for greater than about 90% of raw material of the recycled sheet.

The special sheet refers to an OHP (Overhead Projector) film and a label sheet. The special sheet contains a medium with water resistance, insulating property, electrical conductivity and filtering function.

Each of the "recycled sheet", the "special sheet" and the "sheet of which grammage is smaller than 64 g/m$^2$" has the grammage smaller the grammage of the normal sheet. The recycled sheet and the like is thinner than the thickness of the normal sheet.

The number of the decolored times of the recycled sheet and the like is smaller than that of the decolored times of the normal sheet. A marking area of the recycled sheet is larger than the default value.

The "sheet of which grammage is greater than 64 g/m$^2$ and smaller than 163 g/m$^2$" has the grammage same as that of the normal sheet.

The "sheet of which grammage is greater than 163 g/m$^2$" has the grammage greater than that of the normal sheet.

The number of the decolored times of the "sheet of which grammage is greater than 163 g/m$^2$" is more than that of the reuse times of the normal sheet. The marking area of the "sheet of which grammage is greater than 163 g/m$^2$" is smaller than the default value.

Further, in FIG. 2, the recording section 14 prints a printing mark on the medium according to a marking area designated by the memory table 41.

FIG. 5A is a first example of a printing mark regarded as reference. The recording section 14 records the printing mark (thick line) on the medium.

The printing mark of FIG. 5A is a mark that is printed on the normal sheet and is regarded as a reference mark. The printing mark is, for example, a quadrangle. The recording section 14 pre-stores the length of one side of the quadrangle.

The recording section 14 records the printing mark on the margin region of the medium. The recording section 14 records the same printing mark on the medium the type of which is a "sheet of which grammage is greater than 64 g/m$^2$ and smaller than 163 g/m$^2$".

FIG. 5B is an example of a printing mark smaller than the reference mark. The dotted line indicates the reference mark.

In a case in which the type of medium is the "sheet of which grammage is greater than 163 g/m$^2$", as shown in FIG. 5B, the recording section 14 records the printing mark whose size is smaller than that of the reference mark.

Figure 5C:
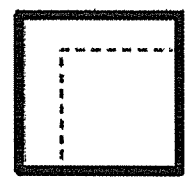

FIG. 5C is an example of a printing mark greater than reference mark. The dotted line indicates the reference mark.

In a case in which the type of medium is the recycled sheet, the special sheet or the "sheet of which grammage is smaller than 64 g/m$^2$", as shown FIG. 5C, the recording section 14 records the printing mark whose size is larger than that of the reference mark.

In FIG. 2, a storage 210 in the control system 200 stores the memory table 41.

The storage 210 may store sizes of a variety of media as determined sizes. The determined size contains a short side dimension and a long side dimension of a medium.

Specifically, the storage 210 stores the determined sizes such as A4, B4, A3 of ISO (International Organization for Standardization) 216; letter; legal-size; and ledger.

The control system 200 may arrange the memory table 41 in a ROM 223.

The control system 200 may arrange the memory table 41 in a server device via a network.

The change section 15 and the recording section 14 may share pattern data of a printing mark.

The control system 200 pre-stores the pattern data of the printing mark like FIG. 5A in, for example, the storage 210.

The storage 210 stores an application program and an OS (Operating System). The application program is read by the scanner 106 and contains a program of executing decolorization by the eraser 108.

A mass storage device such as a hard disk drive, a silicon disk drive and a flash memory may be used in the storage 210.

The control system 200 may install functions of the determination section 13 and the change section 15 in the controller 129.

The determination section 13, the change section 15, the recording section 14 and a plurality of elements other than those are connected with one another through a bus line 201. The determination section 13, the change section 15 and the recording section 14 read required data from the controller 129.

The controller 129 unites the entire control.

The controller 129 conveys a medium from the scanner 106 to the eraser 108 through a conveyance mechanism 214 at the timing when the medium is output from the scanner 106.

The controller 129 again conveys the medium from the eraser 108 to the scanner 106 through the conveyance mechanism 214 at the timing when the medium is output from the eraser 108.

The function of the controller 129 is executed through software by a processor 221, the ROM (Read Only Memory) 223 and a RAM (Random Access Memory) 224.

The ROM 223 stores a control program. The ROM 224 stores the position of a printing mark corresponding to the size of a medium. The ROM 224 stores shape, size and concentration of a printing mark corresponding to the size of the medium.

The RAM 224 provides a temporary working area in the processor 221.

Before the eraser 108 decolors an image of a conveyor 36, the image of the conveyor 36 is read by the scanner 106; after the eraser 108 decolors the image of the conveyor 36, the image of the decolored conveyor 36 is read by the scanner 106.

Furthermore, the control system 200 comprises the conveyance mechanism 214, the scanner 106, the page memory 202, the eraser 108 and the operation panel 135.

The conveyance mechanism 214 individually drives each of motors arranged in the sheet feed section 104 and a plurality of roller pairs 132. The conveyance mechanism 214 changes the rotational positions of the gates 126 and 128.

Next, operations of changing the times corresponding to the type of a medium carried by the decoloring apparatus 12 with the foregoing structure are described separately in cases of (i)-(v).

The type of medium is (i) a "sheet of which grammage is greater than 163 g/m$^2$"; and (ii) a "sheet of which grammage is greater than 64 g/m$^2$ and smaller than 163 g/m$^2$"; the type of medium is (iii) a "sheet of which grammage is smaller than 64 g/m$^2$"; (iv) normal sheet; and (v) recycled sheet or special sheet.

(i) A case in which the type of medium is the "sheet of which grammage is greater than 163 g/m$^2$"

A medium is set in the decoloring apparatus 12. The medium contains a decolorable image and a decolorable printing mark.

It is assumed that the type of medium is unknown to the decoloring apparatus 12. The upper limit value of the decolorization times of the medium is unknown to the decoloring apparatus 12.

The decoloring apparatus 12 enables the scanner 106 to start a reading operation. The scanner 106 writes the scanned image in the page memory 202.

Further, the scanner 106 reads a predetermined marking area of the medium.

The determination section 13 calculates a ratio of the total of areas of printing marks to the area of the marking region.

In a case in which the total area is equal to or greater than a predetermined threshold value area, the determination section 13 determines that the medium cannot be reused. The conveyance mechanism 214 discharges the medium to the reject tray 112. The decoloring apparatus 12 terminates the processing.

Otherwise, in a case in which the total area is smaller than the threshold value area, the determination section 13 determines that the medium can still be reused.

The conveyance mechanism 214 sends the medium to the eraser 108. The eraser 108 decolors the image on the medium. The conveyance mechanism 214 sends the decolored medium to the scanner 106 again.

Figure 4:
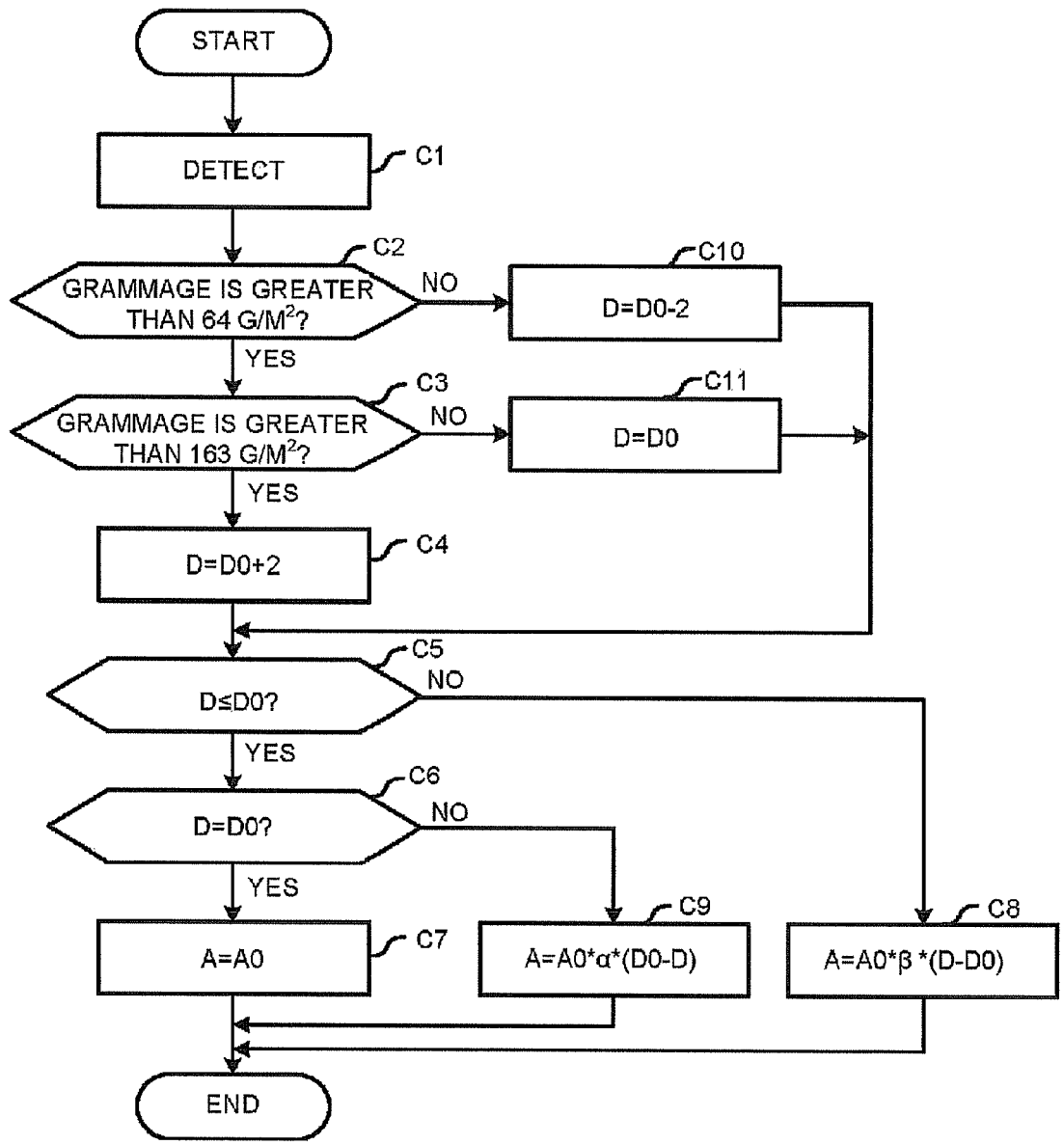
FIG. 4 is a flowchart illustrating a determination processing of the type of the medium through the marking apparatus according to the embodiment.

FIG. 4 is a flowchart for describing a determination processing of the type of a medium carried by the marking apparatus according to the embodiment.

Next, the controller 129 enables the determination section 13 to determine the type of medium.

In Act C1, the media sensor 113 outputs a detection signal corresponding to light of the medium to the controller 129. The controller 129 may use the media sensor 19.

The determination section 13 determines whether or not the type of the medium indicated by the signal from the media sensor 113 is the "sheet of which grammage is greater than 64 $g/m^2$" in Act C2.

If the result of the determination in Act C2 is "YES", through the "YES" route, in Act C3, the determination section 13 determines whether or not the type of the medium is the "sheet of which grammage is greater than 163 $g/m^2$".

If the result of the determination in Act C3 is "YES", the determination section 13 determines that the type of the medium is the "sheet of which grammage is greater than 163 $g/m^2$".

Through the "YES" route of Act C3, in Act C4, the change section 15 refers to the memory table 41 to set an upper limit value D of the decolorization times set according to the medium to a value obtained by adding 2 to default value D0.

Herein, the default value D0 is assumed as, for example, 5. The decoloring apparatus 12 determines that the upper limit value D of the decolorization times of the medium set is 7 times.

Subsequently, a processing of changing the marking area is described.

In Act C5, the change section 15 compares the upper limit value D (D=7) of the decolorization times with the default value D0.

In the result of the determination in Act C5 is "NO", through the "NO" route, in Act C8, the change section 15 generates a marking area A through the following equation.

$$\text{Marking area } A = \text{default value } A0 * \beta * (D - D0)$$

Herein, β is a constant with a value to make the marking area smaller than the default value A0. "*" indicates multiplication.

In FIG. 4, the processing by the change section 15 is terminated temporarily. The recording section 14 prints, for example, the smaller printing mark like FIG. 5B on the medium.

The decoloring apparatus 12 discharges the medium to reuse tray 110.

The printing mark of the thick sheet is small.

In this way, the thick sheet is processed according to the decolorization times.

(ii) A case in which the type of medium is the "sheet of which grammage is greater than 64 $g/m^2$ and smaller than 163 $g/m^2$".

Another medium is set in the decoloring apparatus 12. The type of the medium is unknown. An upper limit value D of the decolorization times of the medium is also unknown.

Initially, the scanner 106 stores the scan image.

Through the calculation of the ratio of the total area, the determination section 13 determines whether the medium can be reused or not.

The conveyance mechanism 214 discharges the medium determined to be non-reusable to the reject tray 112. The decoloring apparatus 12 terminates the processing.

Otherwise, the conveyance mechanism 214 sends the medium determined to be reusable to the eraser 108. The eraser 108 decolors the image on the medium. The conveyance mechanism 214 sends the decolored medium to the scanner 106 again.

Next, the controller 129 enables the determination section 13 to determine the type of the medium.

The determination section 13 carries out the determination operation through the output of the media sensor 113 (Act C1 of FIG. 4) and determines whether or not the type of the medium is the "sheet of which grammage is greater than 64 $g/m^2$" (Act C2).

If the determination section 13 determines the result of the determination in Act C2 is "YES", through the "YES" route, the determination section 13 further determines whether or not the type of the medium is the "sheet of which grammage is greater than 163 $g/m^2$" (Act C3).

If the result of the determination in Act C3 is "NO", through the "NO" route, in Act C11, the determination section 13 determines whether or not the type of medium is the "sheet of which grammage is greater than 64 $g/m^2$ and smaller than 163 $g/m^2$".

The change section 15 refers to the memory table 41 to set the upper limit value D of the decolorization times to the default value D0 (Act C11).

The default value D0 is 5. The decoloring apparatus 12 determines "D=5".

Subsequently, the change section 15 executes a processing of changing the marking area A.

If the result of the determination in Act C5 is "YES", through the "YES" route, in Act C6, the change section 15 determines whether or not the upper limit value D of the decolorization times is equal to the default value D0.

If the result of the determination in Act C6 is "YES", through the "YES" route, in Act C7, the change section 15 sets the marking area A to the default value A0.

The recording section 14 prints the printing mark on the medium. The recording section 14 records, for example, the printing mark like FIG. 5A on the medium.

The decoloring apparatus 12 discharges the medium to reuse tray 110.

In a case of the "sheet of which grammage is greater than 64 g/m² and smaller than 163 g/m²", the decoloring apparatus 12 does not change the magnitude of the printing mark.

(iii) A case in which the type of medium is the "sheet of which grammage is smaller than 64 g/m²"

Another medium is set in the decoloring apparatus 12. The type of medium is unknown. A upper limit value D of the decolorization times of the medium is also unknown.

The scanner 106 stores the scan image. The determination section 13 determines whether or not the medium can be reused.

The conveyance mechanism 214 discharges the medium determined to be non-reusable to the reject tray 112. The decoloring apparatus 12 terminates the processing.

Otherwise, the conveyance mechanism 214 sends the medium determined to be reusable to the eraser 108. The eraser 108 decolors the image on the medium. The conveyance mechanism 214 sends the decolored medium to the scanner 106 again.

The controller 129 enables the determination section 13 to determine the type of medium.

The determination section 13 carries out the determination operation through the output of the media sensor 113 (Act C1) and determines whether or not the type of the medium is the "sheet of which grammage is greater than 64 g/m²" (Act C2).

If the result of the determination in Act C2 is "NO", through the "NO" route, the determination section 13 determines that the type of the medium is the "sheet of which grammage is smaller than 64 g/m²" (Act C10).

In Act C10, the determination section 13 subtracts 2 from the default value D0. The decoloring apparatus 12 determines "D=3" due to "D0=5".

Subsequently, the determination section 13 compares the upper limit value D (D=3) of the decolorization times with the default value D0 (Act C5).

If the result of the determination in Act C5 is "YES", through the "YES" route, in Act C6, the change section 15 determines whether or not the upper limit value D (D=3) of the decolorization times is equal to the default value D0.

If the result of the determination in Act C6 is "NO", through the "NO" route, in Act C9, the change section 15 generates a marking area A through the following equation.

Marking area $A$=default value $A0*\alpha*(D0-D)$

The $\alpha$ indicates a constant with a value to make the marking area greater than the default value A0.

The recording section 14 prints, for example, the larger printing mark like FIG. 5C.

The decoloring apparatus 12 discharges the medium to the reuse tray 110.

The printing mark of the thin sheet is large.

(iv) In a case in which the type of medium is a normal sheet, the recording section 14 records a printing mark on the medium similarly to the foregoing processing of (ii) without changing the magnitude the printing mark.

(v) In a case in which the type of medium is a recycled sheet or a special sheet, the recording section 14 records a larger printing mark on the medium similarly to the foregoing processing of (iii).

In the cases of (i), (ii), (iii), (iv) and (v), the marking apparatus according to the present embodiment can change the recording method of the decolored times according to the type of medium.

It is possible to avoid the risk of occurrence of JAM due to the increase of curl amount resulting from the repetition of the decoloring processing on the thin medium.

In a case in which the medium is the special sheet, it is possible to avoid the risk that the color of the toner on the medium remains without erasing.

The reuse times can be increased for the thick sheet.

According to the marking processing of the present embodiment, the printing mark can be changed properly by comparing the upper limit value of the decolorization times with the default value to change the upper limit value.

The printing mark corresponding to the life times of the medium can be recorded according to the type of the medium.

(Modification)

In the foregoing embodiment, the recording section 14 changes the shape of the reference mark variously.

Figure 5D:
Figure 5E:
Figure 5F:
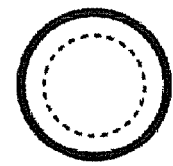

FIGS. 5D through 5F are a second example of a printing mark taken as a reference. The recording section 14 may use, for example, a circle. The recording section 14 pre-stores the radius of the circle.

The recording section 14 records the reference mark like FIG. 5D.

FIG. 5E is an example of the printing mark smaller than the reference mark. The dotted line indicates the reference mark.

The recording section 14 records the printing mark of which size is smaller than that of the reference mark according to the type of the medium and an upper limit value D of the erasure times set according to the medium on the medium.

FIG. 5F is an example of the printing mark greater than the reference mark. The dotted line indicates the reference mark.

The recording section 14 records the printing mark of which size is greater than that of the reference mark according to the type of the medium and an upper limit value D of the erasure times on the medium.

The number of reference marks can be changed variously.

Figure 5G:
Figure 5H:
Figure 5I:
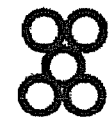

FIGS. 5G through 5I are a third example of the printing mark taken as reference.

The recording section 14 records, for example, three printing marks as the reference mark like FIG. 5G.

FIG. 5H is an example of the printing mark with a smaller number.

The recording section 14 records the printing mark with a smaller number according to the type of the medium and an upper limit value D of the erasure times set according to the medium on the medium.

FIG. 5I is an example of the printing mark with a greater number.

The recording section 14 records the printing mark with a greater number according to the type of the medium and an upper limit value D of the erasure times on the medium.

OTHER EMBODIMENT

In the foregoing embodiment, the recording section 14 may shift the position of a printing mark to be printed later on the medium from the initial position of the printing mark in the latter printing.

In the foregoing embodiment, though the ink of the printing mark is non-decolorable ink, the marking apparatus of the embodiment may use decolorable ink.

In the foregoing embodiment, the arrangement of the operation panel 135 and the controller 129 is exemplified in the decoloring apparatus 12. The marking apparatus of the embodiment can adopt an arrangement different from the foregoing arrangement.

In the foregoing embodiment, the flowchart is exemplified and is not limited to these processing. The method of the detection processing can be modified variously.

In the foregoing embodiment, the change of the recording method of the times depends on the change of shape, magnitude and quantity of the printing mark. The marking apparatus may change the concentration of the ink of the printing mark. The color and the brightness of the ink to be used for the printing mark may be changed. The marking apparatus may change the position of the printing mark on the medium.

An electrophotographic type image forming process engine that uses toner may be used in the recording section 14. The electrophotographic type marking apparatus may change the method of swing dots indicating the printing mark according to the type of the medium. For example, the marking apparatus may change gradation according to the type of the medium.

The marking apparatus may separate the determination section, the change section and the recording section via a network (or cable). The example to separate them is a case in which a floor where the recording section is arranged is separate from a floor where the marking apparatus comprising the determination section and the change section is arranged.

Superiorities of the marking apparatus are not damaged with respect to embodiments that are just modified to be executed in various ways.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A marking apparatus, comprising:
a determination section configured to determine the type of a medium on which an image is formed with decolorable image forming material
a recording section configured to record a mark indicating decolored times of the image on the medium on which the image is formed with the decolorable image forming material; and
a change section configured to change a recording method of the mark recorded by the recording section according to the determination result of the medium determined by the determination section.

2. The marking apparatus of claim 1, wherein
the change section changes the mark according to the medium determined by the determination section.

3. The marking apparatus of claim 2, wherein
the change section changes an area of the printing mark according to grammage of the medium.

4. The marking apparatus of claim 2, wherein
the change section changes at least one selected from among shape, magnitude, quantity and recording material of the printing mark and a position of the printing mark.

5. The marking apparatus of claim 2, further comprising
a memory table configured to associate the type of the medium with the times.

6. The marking apparatus of claim 1, wherein
the change section changes the mark according to the thickness of the medium.

7. The marking apparatus of claim 1, wherein
the change section reduces the times according to the determination result indicating that the type is which one of a recycled sheet, a special sheet and a "sheet of which grammage is smaller than 64 $g/m^2$".

8. The marking apparatus of claim 1, wherein
the change section increases the times according to the determination result indicating a sheet of which the type is a "sheet of which grammage is greater than 163 $g/m^2$".

9. The marking apparatus of claim 1, wherein
the determination section determines the type of the medium according to any one of the setting to an operation panel, the type of a cassette previously associated with the type of the medium and detection output by a medium sensor.

10. The marking apparatus of claim 1, wherein
the determination section determines whether the medium can still be reused or not by calculating a ratio of the total of the areas of markings to the area of a region predetermined on the medium.

* * * * *